United States Patent [19]

Doets

[11] Patent Number: 5,013,431

[45] Date of Patent: May 7, 1991

[54] APPARATUS FOR ANAEROBIC PURIFICATION OF WASTE WATER

[75] Inventor: Albert R. Doets, Westzaan, Netherlands

[73] Assignee: Meyn Machinefabriek, B.V., Oostzaan, Netherlands

[21] Appl. No.: 343,889

[22] Filed: Apr. 25, 1989

[30] Foreign Application Priority Data

May 9, 1988 [NL] Netherlands ............ 8801221

[51] Int. Cl.⁵ .............................. C02F 3/28
[52] U.S. Cl. ................... 210/188; 210/194; 210/521; 210/539
[58] Field of Search ............... 210/603, 617, 618, 85, 210/180, 188, 194, 197, 521, 537, 539, 540

[56] References Cited

U.S. PATENT DOCUMENTS

| | | | |
|---|---|---|---|
| 4,482,458 | 11/1984 | Rovel et al. | 210/617 X |
| 4,613,434 | 9/1986 | Määtä | 210 180 X/ |
| 4,618,418 | 10/1986 | Heijnen et al. | 210/539 X |
| 4,707,252 | 11/1987 | Durot et al. | 210/618 X |
| 4,832,848 | 5/1989 | Velebil et al. | 210/617 |

Primary Examiner—Tom Wyse
Attorney, Agent, or Firm—Dority & Manning

[57] ABSTRACT

The invention relates to an apparatus for anaerobic purification of waste water, including a reactor space, a supply of influent at the lower side, gas separators and a discharge of gas and a discharge of effluent, respectively, at the upper side of the apparatus. Said apparatus is characterized in that it is in height subdivided into a reactor space, thereabove a sludge-water separator separated from the reactor space and a gas-sludgewater separator above the sludge-water separator separated therefrom, and the apparatus further includes a central tube for recirculating the anaerobic sludgewater material in the reactor space, with the supply for influent at the bottom. Futhermore the present invention also relates to a method for anaerobic purification of waste water with the aid of a suitable anaerobic sludge material, by the use of the apparatus of the invention as mentioned before. Said apparatus and method are particularly suitable for the quick and efficient anaerobic purification of waste water.

3 Claims, 1 Drawing Sheet

APPARATUS FOR ANAEROBIC PURIFICATION OF WASTE WATER

BACKGROUND OF THE INVENTION

The present invention relates to an apparatus for anaerobic purification of waste water, including a reactor space, a supply of influent at the lower side, gas separators and a discharge of gas and a discharge of effluent, respectively, at the upper side of the apparatus and to a method for anaerobic purification of waste water.

Such apparatus and method are known from Dutch patent application No. 8402337.

In the known apparatus the reactor passages, separator passages and return passage are in communication with each other.

This known apparatus has the disadvantage that it includes a great number of small gas caps, whereby the apparatus is complicated and, therefore, very expensive. Furthermore, the known apparatus occupies much space.

In such apparatus a so-called three-phase separation is effected wherein, at the upper side of the reactor in one and the same space, the separation of gas-sludge-water (G/S/L) takes place. Such systems experience in practice technical control problems resulting in less efficient purification.

Another important disadvantage of the known apparatus is the fact that good mixing of the active anaerobic sludge material and the influent does not take place, resulting in a less efficient anaerobic conversion and thus a longer required residence time of the influent in the apparatus.

SUMMARY OF THE INVENTION

The invention has the object of providing an apparatus wherein the above mentioned disadvantages are efficiently removed.

For this purpose the invention relates to an apparatus for anaerobic purification of waste water, including a reactor space, a supply of influent at the lower side, gas separators and a discharge of gas and a discharge of effluent, respectively, at the upper side of the apparatus, characterized in that the apparatus, in height, is subdivided into a reactor space, thereabove a sludge-water separator (S/L) separated from the reactor space, and a gas-sludgewater separator (G/SL) above the sludge-water (S/L) separator separated therefrom, and the apparatus further includes a central tube for recirculating the anaerobic sludgewater material in the reactor space, with the supply for influent at the bottom.

Surprisingly, it has been found according to the invention that such apparatus which is mainly subdivided into three spaces, namely the reactor space, the space thereabove, which is the sludge-water separation space which is separated from the reactor space, and the upper space which constitutes the gas-sludgewater separation space, is particularly suitable for the quick and efficient anaerobic purification of waste water.

Preferably, right above the supply for influent, i.e. the waste water, there is provided a double-walled conical distributor for the recirculated anaerobic sludgewater material and the influent, the outer wall of which is integral with the central tube, wherein the sludgewater material from the gas-sludgewater separator is carried back to the reactor space.

Preferably, the reactor space is provided with a number of conical guiding-mixing members for promoting a good mixing between the waste water and sludge particles whereby a good contact between the anaerobic sludge material and the waste water components to be decomposed is guaranteed. Thereby a conversion, as quick and efficient as possible, of the materials to be decomposed anaerobically to, mainly, methane gas is made possible.

A second conical guiding-mixing member joins the wall of the reactor and includes openings for passing the gas already formed in the reactor.

In a favourable embodiment, the apparatus includes two superposed conical gas separators for collecting the formed gas and for discharging it, together with sludgewater material through transport tubes to the gas-sludgewater separator, the upper side of the gas separator being open so that the reactor contents can move upwardly.

Surprisingly it has been found that by using two large gas caps above each other instead of many small ones a good efficient purification is obtained with an apparatus, which, in size, is considerably smaller than the known type of apparatus and, furthermore, is much simpler in construction.

In certain cases, however, three or four gas separators above each other may be used.

According to the invention the conical gas separator is provided at its edges with openings which are connected to tubes for discharging the formed gas.

Furthermore, the lower gas separator, at the upper side, is provided with a gas ejector for transporting sludgewater material coming from the sludge-water separator, to the gas-sludgewater separator.

For the feed of sludgewater material from the reactor space into the separated sludge-water separator a supply of sludgewater is provided.

Preferably, a lamellar package is used in the sludge-water separator for optimizing the separation of sludge and water. Due to the low hydraulic surface loading separator a relatively small diameter apparatus will be sufficient.

The separated sludge sinks downwardly in the sludge-water separator and can be discharged by a tube to the gas ejector.

Usually, the apparatus is provided with a discharge for removing the surplus sludge which during the process is growing. This discharge can be in the reactor wall as well as in the wall of the sludge-water separator, or in both.

For inspecting the sludge-water separator the apparatus of the invention preferably includes an inspection trap.

In comparison with the known apparatus the present apparatus occupies much less space, since the width of the apparatus usually is 2-3 meters with a height of 15-20 meters.

Furthermore, the present invention includes a method for anaerobic purification of waste water with the aid of a suitable anaerobic sludge material, characterized in that the purification takes place in an apparatus, according to the invention, wherein the waste water to be purified is introduced at the bottom of the apparatus through the supply and is thoroughly mixed with sludgewater material by the distributor, wherein during passage of the reactor space or chamber the waste water components to be anaerobically decomposed are mainly converted to methane gas, and subsequently, the gas is discharged by gas separators from the reactor, wherein the gas from the gas separator through the conduit together with sludgewater material arrives in the gas-sludgewater separator and the gas from the gas separator through the conduit separating the gas from the sludgewater and through the discharge, is removed from the apparatus. The sludge is separated from the water in the sludge-water separator, into which the sludgewater through the supply is introduced, wherein the separated sludge is carried through the discharge to the gas ejector and therefrom through the tube to the gas-sludge water separator, from which the sludge water is carried through the tubes and the central tube back into the reactor so that an internal sludge recirculation is effected, whereas the purified water through the discharge is discharged from the sludge-water separator.

Surprisingly, it has been found that according to the present method the conversion of the waste water components to be decomposed anaerobically with the formation of mainly methane gas substantially takes place in about two thirds of the reactor space.

The rest of the conversion takes place in the remaining part of the reactor space.

The anaerobic purification by the present method can be effected with a sludge loading of at least 20 kg CZV/m$^3$ reactor contents.

The anaerobic conversion in the reactor usually takes place at a temperature between 20°–40° C., preferably at a temperature of 30°–35° C.

The present method is particularly suitable for treating carbohydrates containing waste water.

Furthermore, with the present method fat-protein containing waste water can be successfully used.

Good results are obtained when the sludge contents in the waste water in the reactor is 50–100 kg/m$^3$.

It is noted that the gas which mainly consists of methane and leaves the apparatus at the upper side a.o. can be used for heating purposes. The purified water, i.e. the effluent, may be discharged to the sewerage.

With the present apparatus and method an efficiency of about 80–90% on CZV base can be reached.

BRIEF DESCRIPTION OF THE DRAWINGS

The apparatus of the invention now will be explained by way of the drawing which illustrates a non-limiting favourable embodiment.

DETAILED DESCRIPTION OF THE DRAWINGS

Figure 1:
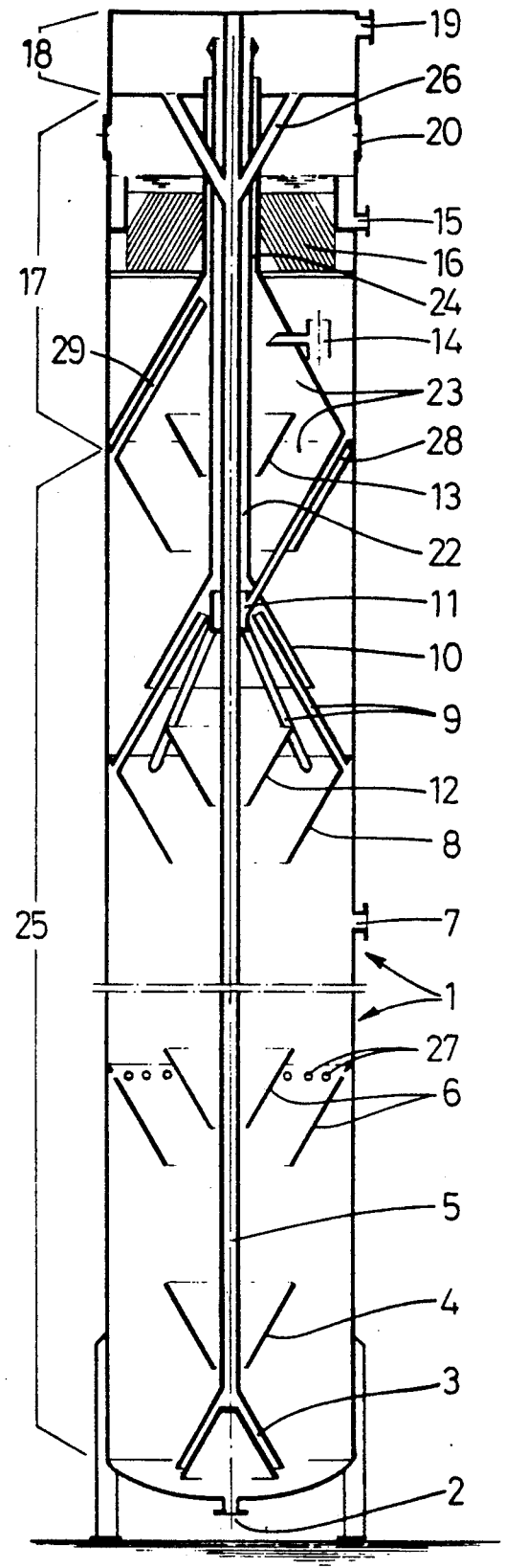
FIG. 1 shows a vertical sectional view of the apparatus of the invention.

The anaerobic waste water purification apparatus 1 illustrated in FIG. 1 is cylindrical and usually has a length of 15–20 m with a diameter of 2–3 m. The apparatus preferably is fabricated from stainless steel.

At the bottom of the apparatus there is a supply opening 2 for influent, i.e. the waste water to be purified. For purification, according to the invention, a carbohydrate containing waste water is considered, for example, coming from the sugar industry, potato processing industry etc. Also fat-protein waste water can be treated.

Just above the supply opening 2 there is disposed a distributor 3 for the recirculated sludgewater material and the influent, which distributor is a double-walled cone, the outer wall of which is integral with a central return tube 5 for returning anaerobic sludgewater material from a gas-sludgewater separator 18 through tubes 26 and the central tube 5 to the reactor space 25.

The central tube 5 extends through nearly the total length of the apparatus. Around the central tube 5 is disposed a conical guiding-mixing member 4 just above the double-walled distributor 3, which guiding-mixing member 4 effects a good mixing of the sludgewater material with the waste water to be purified. Above the guiding-mixing member 4 is disposed a double-walled guiding-mixing member 6, and the outer guiding-mixing member is welded to the wall of the reactor. At the periphery of the outer guiding-mixing member openings 27 are disposed for passing the gas which is formed in the lower half of the reactor.

In the wall of the reactor at different heights there are one or more discharges 7 for discharging surplus anaerobic sludge from the reactor. During the purification process the quantity of anaerobic sludge increases.

Preferably, the reactor has two gas separators 8 and 23 from which the gas formed in the reactor is carried to the gas-sludgewater separator 18.

The lower gas cap 8 is provided with at least two discharge tubes 9 for the gas. However, four or more gas discharge tubes may be used.

Around the central tube 5 is disposed a gas ejector 11, this is arranged in the conical cap 10.

Through the gas, ejector 11 by the discharge velocity of the formed gas the sludgewater material coming from the sludge-water separator 17 and arriving through the tube 28 into the gas ejector 11, is transported through the rising conduit 22 to the gas-sludgewater separator 18. The conduit 22 is arranged concentrically around the tube 5.

Above the first gas separator 8 there is a second gas separator 23. Therefrom the remaining gas is transported through conduit 29 and conduit 24 to the gas-sludgewater separator 18. Above the gas separator 23 is disposed the sludge-water separator 17 which is fully separated from the reactor space 25 and the gas-sludgewater separator 18. On the casing of the gas separator 23 is disposed a supply 14 for sludgewater material to the sludge-water separator 17. In the sludge-water separator use is made of a lamellar package 16 for separating sludge particles from the water. The use of lamellar package 16 in the sludge-water separator 17 effects a low hydraulic surface loading, which results in a good and quick separation of sludge and water.

In the sludge-water separator 17 is disposed a discharge 15 for the effluent, i.e. the purified water.

Above the sludge-water separator 17 there is arranged the gas-sludgewater separator 18 which is separated from the sludge-water separator 17 situated therebelow. Gas which thereby is separated is removed from the apparatus through the gas discharge opening 19.

The separated sludgewater material from the gas-sludgewater separator 18 subsequently can be added through tube 26 to the central tube 5.

The sludge-water separator 17 preferably includes an inspection trap 20.

The efficiency of such apparatus is about 80–90% on CZV base.

Figure 2:
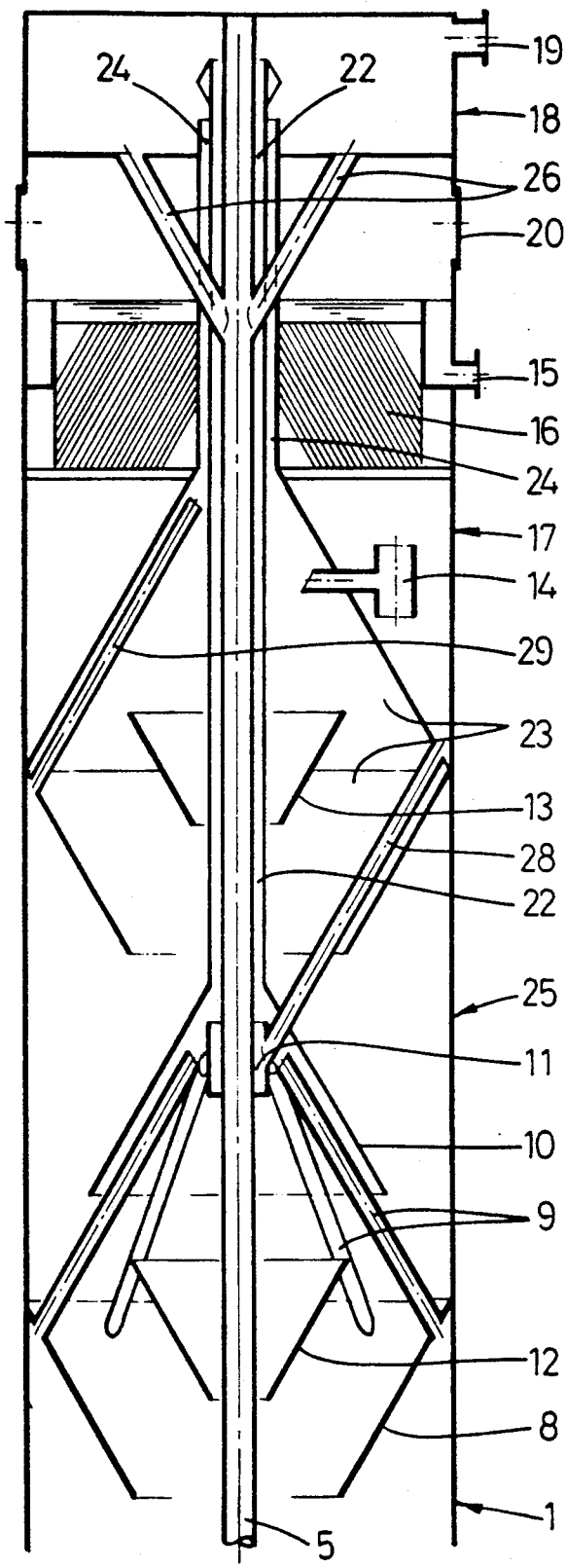
FIG. 2 shows en enlarged portion of the upper half of the apparatus of FIG. 1.

It will be clear that the invention is not limited to the apparatus illustrated in FIGS. 1 and 2.

I claim:

1. Apparatus for the anaerobic purification of waste water with an anaerobic sludge material, comprising:

(a) an elongated vertical reactor chamber having means for receiving waste water and sludge material at the bottom of said chamber;
(b) means for supplying waste water to the bottom of said reactor chamber;
(c) baffle means disposed within said reactor chamber for mixing sludge material with said waste water;
(d) a sludge-wastewater separator disposed above said reactor chamber for receiving the mixed sludge material and waste water;
(e) means within said sludge-wastewater separator for separating said sludge from said water after said water is purified;
(f) a gas-sludgewater separator disposed above said sludge-waste water separator for receiving a residue of said sludge and waste water from said sludge-wastewater separator;
(g) means within said gas-sludgewater separator for separating gas from said sludge-wastewater;
(h) two super-imposed conical gas separator disposed within said reactor chamber above said baffle means for collecting gas formed in said reactor chamber and for discharging said gas with sludgewater material into said gas-sludgewater separator, said gas separators being opened at their upper side so that said reactor chamber contents can move upwardly therein; and
(i) a central vertical tube having an opening in said gas-sludgewater separator for receiving sludge water and returning it to said reactor chamber through an outlet opening into said chamber for mixing with waste water supplied to the bottom of said chamber.

2. Apparatus as set forth in claim 1, wherein one of said conical gas separators is provided at its edges with openings connected to a plurality of tubes for discharging gas formed in said reactor chamber.

3. Apparatus as set forth in claim 2, wherein said gas separator is provided at its upper side with a gas ejector for transporting sludgewater material received from said sludge-water separator.

* * * * *